Figure 1:
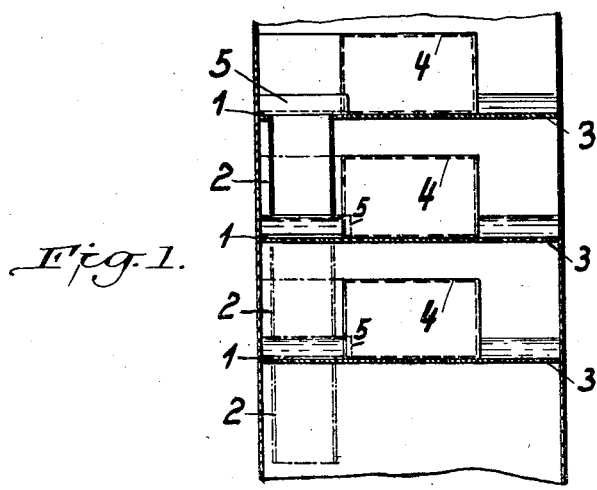

March 6, 1934.  R. LINDE  1,950,313

RECTIFICATION

Filed Jan. 13, 1933

Inventor:
Richard Linde,
By Byrnes Townsend & Potter,
Attorneys.

Patented Mar. 6, 1934

1,950,313

UNITED STATES PATENT OFFICE 1,950,313

RECTIFICATION

Richard Linde, Munich, Germany, assignor to Gesellschaft für Linde's Eismaschinen A. G., Munich, Germany, a corporation of Germany Application January 13, 1933, Serial No. 651,651
In Germany January 29, 1932

5 Claims. (Cl. 261—113)

This invention is an improvement in rectification and is particularly directed to a new and improved rectification column.

The separation of fluid mixtures by rectification is usually effected by causing the liquid to flow down over the separate rectifying plates in a rectifying column, upon which it comes into intimate contact with the vapors rising from below and thereby becoming enriched in the higher boiling components. The optimum condition has heretofore been considered to exist when the liquid flowing from a plate was in equilibrium with the vapors arising therefrom, whereby it is assumed that on each plate the mixing of the liquid is so thorough that its average composition is the same as that of the liquid flowing therefrom.

The present invention is directed to a system for carrying out a rectification operation, which makes it possible to obtain efficiencies which are even greater than the most favorable efficiencies heretofore calculated to be attainable. It has been found that a surprising increase in the efficiency of a rectifier plate is obtained, by greatly repressing the heretofore very considerable mixing of the liquid on the plates without decreasing the intimate contact between vapor and liquid on the plate. To this end the vapors are led through the liquid in such a way that while a very intimate contact of finely divided portions of vapor with the liquid is obtained on an extensive surface, the uniform movement of the liquid on the plate is nevertheless not disturbed, so that eddy currents and back currents in the liquid, which would cause a mixing of the liquid richer in higher boiling constituents with that less enriched, are avoided.

By this means it results that the liquid at the end of its passage over a plate has a substantially higher content of higher boiling constituents than corresponds to the average composition of the liquid on the plate. The vapors passing through the liquid are therefore of different composition over different portions of the plate, and it is possible in this way, in spite of incomplete equilibrium between liquid and vapor, to obtain a liquid flowing off the plate with a higher concentration of the higher boiling constituents than a liquid in equilibrium with the average composition of the vapors leaving the plate.

According to the invention also the closest possible approach to a true countercurrent flow of the liquid and vapor is effected, in that the liquid in passing over the plate continually comes in contact with vapors which are progressively richer in higher boiling components. A complete countercurrent flow in rectification processes has hitherto been obtained only in rectifying columns in which liquid and vapors flowed countercurrent to each other through vertical cylinders filled with packing material of large surface. In this case, however, the intimacy of the contact between liquid and vapors and thereby the attainment of equilibrium between the two, which is the purpose of the rectification, is much less than in columns with separate plates in which the vapors not only stream past the liquid, but pass through the liquid. The impairment of the interchange between vapor and liquid in packed columns far outweighs the principal advantage of the countercurrent flow which they provide.

The present invention, on the contrary, makes possible a close approach to complete countercurrent flow of liquid and vapors together with full attainment of the most favorable equilibrium relationships obtainable with columns with separate plates. The principle of the invention can be indicated as effecting a cross-current flow of liquid and vapors on each plate. The whole of the liquid comes into contact on each plate successively with a single portion of the vapors which flow almost at right angles to the flow of the liquid. The vapors thus present at each point in the liquid current a content of higher boiling constituents progressively increasing in the direction of flow of the liquid. The possibility of intermixing of the vapors in flowing from one plate to another as well as of the liquid on the plate, is decreased at the same time as the cross-current flow on the various plates is strengthened.

The principle of the invention is put into practice by causing the liquid to flow over the plate in a thin layer with rather high velocity by the longest possible path, while the vapors released in a multitude of tiny bubbles pass through the layer of liquid. The flow of the vapors is substantially at right angles to the plane of motion of the liquid in order to avoid any intermixing of the liquid in the direction of flow thereof. In order to disturb the flow of the liquid as little as possible by the passage of the vapors through the plate, they can be withdrawn in the direction of flow. The intervals between the vapor openings in the plate are preferably so chosen that the bubbles do not coalesce within the liquid. The intervals are advantageously twice the diameter of the openings.

The desired countercurrent effect between liquid and vapor is greater, the more uniform is the flow of the liquid, the greater its velocity, the longer its path, and the thinner its layer. A certain minimum depth of liquid, however, cannot be passed, if a suitably intensive interchange between liquid and vapor, and a uniform passage of the vapor through the plate with regard to the fall in level of the liquid, is to be maintained.

Figure 2:
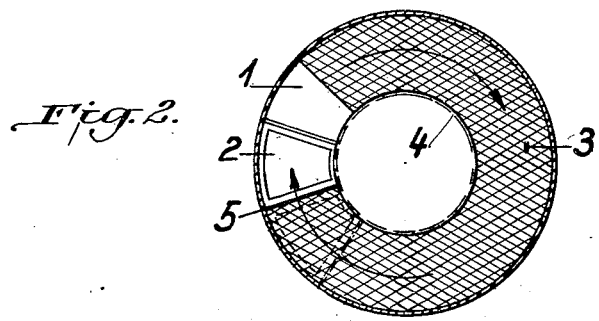
Figure 3:
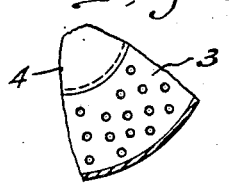

An illustrative embodiment of the invention is shown in the accompanying drawing, in which, Fig. 1 is a vertical section, Fig. 2 is a horizontal section through rectifying plates constructed in accordance with the invention, and Fig. 3 is a fragmentary detail of a rectifier plate constructed in accordance with the invention, wherein the intervals between the openings are twice the diameter of the openings.

The liquid flows through supply conduit 1 onto rectifier plate 3, a perforated tray provided with narrow holes, the central part of the plate being covered with a member 4 concentric to the column. The cover member 4 is substantially or nearly of a height corresponding to the distance between the rectifier plates. After flowing around the annular path 3, the liquid passes over overflow member 5 into downtake conduit 2 which is also the supply conduit for the next lower plate, upon which the liquid then flows in the same way. The downtake and supply conduits are separated by a partition passing from plate to plate, and the sector occupied by the downtake and supply conduits is tightly partitioned against vapor flow. The conduits on each plate are displaced with reference to the preceding plate in such a way that the liquid flows in the same direction on each plate.

The vapors which flow vertically upward, pass through the small holes in the perforated tray and then bubble in finely divided form through the liquid flowing on the tray. In this way an intensive contact between liquid and vapor is effected, without causing back-currents or cross-currents in the liquid. The vapor section between the plates is so great that the flow of vapor is laminar, and therefore the composition of vapors in the vertical direction between two plates remains substantially unchanged, but on the other hand in each annular sector of the plate the composition becomes progressively richer in higher boiling components from supply conduit to the overflow conduit.

Besides the form of plate described, many others are possible. For example, the perforated tray may consist of so-called bell plates or cap plates, in which the vapors are passed into tubes covered with small caps and bubble out in small bubbles beneath the surface of the liquid. It is always essential that the intensive contact between liquid and vapor be effected without hindering the even flow of the liquid.

The apparatus and method of operation of the invention is particularly suitable for the separation of liquid air and other low-boiling mixtures, but can also be used advantageously for the rectification of liquid of any boiling point. The increase in efficiency attained by means of the invention amounts to about 100% and therefore makes possible a very considerable reduction in the external dimensions of a column without reducing its capacity, an advantage which is especially noticeable in working with low-boiling mixtures where the cold losses depend upon the size of the apparatus. A further advantage of the new plate is that a smaller number is sufficient and in this way the pressure drop in the rectifying column may be substantially reduced.

This is also of particular importance in the separation of low-boiling mixtures, since the energy required by compression is in this way considerably reduced.

What I claim is:

1. A rectifying column comprising a plurality of sections, each section comprising a regular annular perforated plate, the central portion of said plate being closed against the passage of both vapors and liquids, a pair of conduits located adjacent each other in one sector of said annular perforated plate, one of said conduits being adapted for supplying liquid from the next superior section to said annular plate and the other conduit being adapted for carrying the liquid to the next inferior section after it has flowed around said annular plate.

2. A rectifying column comprising a plurality of sections, each section comprising a regular annular perforated plate, the central portion of said plate being closed against the passage of both vapors and liquids, the perforations of which are spaced apart at least twice the diameter of the perforations, a pair of conduits located adjacent each other in one sector of said annular perforated plate, one of said conduits being adapted for supplying liquid from the next superior section to said annular plate and the other conduit being adapted for carrying the liquid to the next inferior section after it has flowed around said annular plate.

3. A rectifying column comprising a plurality of sections, each section comprising a regular annular perforated plate, the central portion of said plate being closed against the passage of both vapors and liquids, a pair of conduits located adjacent each other in one sector of said annular perforated plate, one of said conduits being adapted for supplying liquid from the next superior section to said annular plate and the other conduit being adapted for carrying the liquid to the next inferior section after it has flowed around said annular plate, the conduits being sealed against the flow of vapors therethrough.

4. A rectifying column comprising a plurality of sections, each section comprising a circular perforated plate, a tight cover member centrally located over said perforated plate so as to provide an annular tray having its central portion closed against the passage of both vapors and liquids, a pair of conduits located adjacent each other in one sector of said annular tray, one of said conduits being adapted for supplying liquid from the next superior section to said annular tray and the other conduit being adapted for carrying liquid to the next inferior section after it has flowed around said annular tray.

5. A rectifying column comprising a plurality of sections, each section comprising a circular perforated plate, a tight cover member centrally located over said perforated plate so as to provide an annular tray having its central portion closed against the passage of both vapors and liquids, said cover member extending vertically nearly to the next superior plate, a pair of conduits located adjacent each other in one sector of said annular tray, one of said conduits being adapted for supplying liquid from the next superior section to said annular tray and the other conduit being adapted for carrying liquid to the next inferior section after it has flowed around said annular tray.

RICHARD LINDE.